United States Patent
Zhu et al.

(10) Patent No.: US 11,509,262 B2
(45) Date of Patent: Nov. 22, 2022

(54) PHOTOVOLTAIC POWER GENERATION VIRTUAL INERTIA COMPENSATION SYSTEM AND METHOD BASED ON SUPER CAPACITOR ENERGY STORAGE

(71) Applicant: TIANJIN UNIVERSITY, Tianjin (CN)

(72) Inventors: Jiebei Zhu, Tianjin (CN); Zhipeng Shen, Tianjin (CN); Feng Li, Tianjin (CN); Suxuan Li, Tianjin (CN)

(73) Assignee: Tianjin University, Tianjin (CN)

( * ) Notice: Subject to any disclaimer, the term of this patent is extended or adjusted under 35 U.S.C. 154(b) by 156 days.

(21) Appl. No.: 17/183,174

(22) Filed: Feb. 23, 2021

(65) Prior Publication Data
US 2022/0029581 A1  Jan. 27, 2022

(30) Foreign Application Priority Data

Jul. 24, 2020  (CN) .......................... 202010722651.7

(51) Int. Cl.
*H02S 40/32*  (2014.01)
*H02S 40/38*  (2014.01)
*H02J 7/34*  (2006.01)

(52) U.S. Cl.
CPC .............. *H02S 40/32* (2014.12); *H02J 7/345* (2013.01); *H02S 40/38* (2014.12); *H02J 2207/50* (2020.01); *H02J 2300/24* (2020.01)

(58) Field of Classification Search
CPC ....... H01L 31/00–078; Y02E 10/50–60; H02S 40/00–44; H02J 3/383; H02J 3/385; H02J 2300/22; H02J 2300/24; H02J 2300/26
See application file for complete search history.

(56) References Cited

PUBLICATIONS

Tang et al. WO2019035760 original and English translation (Year: 2019).*
Xiao et al. CN106849140 original and English translation (Year: 2017).*

\* cited by examiner

*Primary Examiner* — Bach T Dinh
(74) *Attorney, Agent, or Firm* — Dragon Sun Law Firm, PC; Jinggao Li; Nathaniel Perkins

(57) ABSTRACT

The present invention discloses a photovoltaic power generation virtual inertia compensation system based on SCES, comprising a photovoltaic array, a boost circuit and a grid-connected inverter, which are electrically connected in sequence, and further comprising a supercapacitor assembly for energy storage, a bidirectional DC-DC converter and a virtual inertia control module; an end of the bidirectional DC-DC converter is electrically connected to an output end of the unidirectional DC-DC boost circuit and an input end of the power grid inverter, and the other end thereof is electrically connected to the supercapacitor assembly; the bidirectional DC-DC converter comprises two power switch devices; the virtual inertia control module comprises a first inverting adder, a virtual inertia converter, a second inverting adder, a first PI controller, a third inverting adder, a second PI controller and a PWM modem, which are electrically connected in sequence.

13 Claims, 2 Drawing Sheets

US 11,509,262 B2

PHOTOVOLTAIC POWER GENERATION VIRTUAL INERTIA COMPENSATION SYSTEM AND METHOD BASED ON SUPER CAPACITOR ENERGY STORAGE

CROSS-REFERENCE TO RELATED APPLICATION

This application claims priority from the Chinese patent application 2020107226517 filed Jul. 24, 2020, the content of which is incorporated herein in the entirety by reference.

TECHNICAL FIELD

The present invention relates to the technical field of smart grid control, in particular to a photovoltaic power generation virtual inertia compensation system and method based on super capacitor energy storage (hereinafter referred to as SCES).

BACKGROUND OF THE PRESENT INVENTION

At present, with the increasing depletion of traditional fossil energy and environmental pollution, renewable power generation has received more and more attention. Compared with traditional energy sources, photovoltaic power generation systems have broad development and application prospects in the world's energy distribution pattern due to their many advantages. In order to maximize the use of solar resources, photovoltaic power generation systems usually adopt maximum power point tracking control strategies, which cannot respond to power grid frequency changes. Furthermore, photovoltaic power generation systems usually use power electronic inverters as the interface devices with the large power grid. Power electronic devices have the characteristics of fast response speed and high sensitivity, but they lack the inertia and damping characteristics of traditional synchronous generators. Consequently, as the penetration rate of photovoltaics constantly increases, the regulation capability of the power grid is seriously damaged, and the dynamic security of the power grid frequency constantly decreases.

As solutions for the inertia compensation link, the current main solution is to use virtual synchronous generator (VSG) control. The key point is to add a first-order inertia link in the active power control loop so that the grid-connected inverter can mimic the inertia characteristics of traditional synchronous generators. Its energy source is mainly realized by photovoltaic load shedding and arrangement of energy storage batteries on the DC side. The photovoltaic load shedding solution has limited support capacity, and may cause the failed maximum use of solar energy and reduce the economic benefit of the photovoltaic power generation system. The energy storage batteries arranged on the DC side have a slow dynamic response speed and cannot provide the system with inertia response quickly. Meanwhile, the virtual synchronous generator technology is also susceptible to system frequency noise and causing fluctuation of power.

SUMMARY OF THE PRESENT INVENTION

The purpose of the present invention is to overcome the shortcomings of insufficient inertia of traditional photovoltaic power generation systems and provide a photovoltaic power generation virtual inertia compensation system and method based on SCES. The present invention can provide inertia response and suppress fluctuation of frequency when the AC power grid is disturbed, thereby enhancing the regulation capability of the power grid and improving the stability of the power grid.

To solve the technical problems in the prior art, the following technical solution is employed in the present invention. A photovoltaic power generation virtual inertia compensation system based on SCES, comprising a photovoltaic array, a unidirectional DC-DC boost circuit and a grid-connected inverter, which are electrically connected in sequence, the grid-connected inverter outputting alternating current to the power grid, and further comprising a supercapacitor assembly for energy storage, a bidirectional DC-DC converter and a virtual inertia control module; a port on a side of the bidirectional DC-DC converter is electrically connected to an output end of the unidirectional DC-DC boost circuit and an input end of the power grid inverter, and a port on the other side thereof is electrically connected to the supercapacitor assembly; the bidirectional DC-DC converter comprises two power switch devices; the virtual inertia control module comprises a first inverting adder, a virtual inertia converter, a second inverting adder, a first PI controller, a third inverting adder, a second PI controller and a PWM modem, which are electrically connected in sequence; wherein instantaneous frequency and nominal frequency of the power grid are each input to positive and negative input ends of the first inverting adder; the difference between the instantaneous frequency of the power grid and the nominal frequency of the power grid is input to the virtual inertia converter, and the virtual inertia converter outputs a nominal voltage of the supercapacitor assembly; one input end of the positive and negative input ends of the second inverting adder is electrically connected to an output end of a nominal voltage calculator of the supercapacitor assembly, and an instantaneous voltage of the supercapacitor assembly is input to the other input end of the second inverting adder; one input end of the positive and negative input ends of the third inverting adder is electrically connected to an output end of the first PI controller, and an instantaneous current of the supercapacitor assembly is input to the other input end of the third inverting adder; the PWM modem outputs a pulse signal to control the on/off of the power switch device of the bidirectional DC-DC converter.

Further, the virtual inertia control module further comprises a power grid frequency acquisition unit configured to acquire the instantaneous frequency of the power grid, a voltage acquisition unit configured to acquire the instantaneous voltage of the supercapacitor assembly, and a current acquisition unit configured to acquire an instantaneous current of the supercapacitor assembly.

Further, the power grid frequency acquisition unit is provided with a phase-locked loop configured to detect the instantaneous frequency of the power grid.

Further, the bidirectional DC-DC converter comprises a first fully-controlled power switch device, a second fully-controlled power switch device and an inductor; an emitter of the first fully-controlled power switch device is connected to the positive output end of the unidirectional DC-DC boost circuit; a collector of the second fully-controlled power switch device is connected to the negative output end of the unidirectional DC-DC boost circuit; a collector of the first fully-controlled power switch device is connected to an emitter of the second fully-controlled power switch device and also connected to one end of the inductor, and the other end of the inductor is connected to a anode of the supercapacitor assembly; and the virtual inertia control module outputs pulse signals to correspondingly control the on-duty ratio of the first and second fully-controlled power switch devices.

Further, the power switch devices of the bidirectional DC-DC converter are IGBT, MOSFET or IGCT power switch devices.

Further, the supercapacitor assembly comprises a plurality of paralleled supercapacitor branches; and each supercapacitor branch comprises a plurality of monomer supercapacitors connected in series.

The present invention further provides a photovoltaic power generation virtual inertia compensation method using the photovoltaic power generation virtual inertia compensation system based on SCES. The method comprises the following steps:

step 1: setting a virtual inertia time constant;

step 2: acquiring an instantaneous frequency of a power grid, inputting the acquired instantaneous frequency to an input end of positive and negative input ends of a first inverting adder, and inputting a nominal frequency of the power grid to the other input end, to obtain a difference between the instantaneous frequency and the nominal frequency of the power grid;

step 3: inputting the difference between the instantaneous frequency and the nominal frequency of the power grid to a virtual inertia converter that converts the difference according to the following formula to obtain a nominal voltage of a supercapacitor assembly:

$$U_{dc}^* = \sqrt{U_{dc0}^2 + \frac{4H_{pv}S_{pv}}{C_{sup}f_0}(f - f_0)}$$

where $U_{dc0}$ represents the rated DC voltage of the supercapacitor assembly, $H_{pv}$ represents the virtual inertia time constant, $S_{pv}$ represents the rated capacity of the photovoltaic array, $C_{sup}$ represents the capacitance of the supercapacitor assembly, $f_0$ represents the nominal frequency of the power grid, and f represents the instantaneous frequency of the power grid;

step 4: acquiring the instantaneous voltage of the supercapacitor assembly, inputting the instantaneous voltage of the supercapacitor assembly to an input end of the positive and negative input ends of the first inverting adder, and inputting the nominal voltage of the supercapacitor assembly to the other input end, to obtain a difference between the instantaneous voltage and the nominal voltage of the supercapacitor assembly;

step 5: inputting the difference between the instantaneous voltage and the nominal voltage of the supercapacitor assembly to the first PI controller that outputs a nominal current of the supercapacitor assembly;

step 6: acquiring the instantaneous current of the supercapacitor assembly, inputting the instantaneous current of the supercapacitor assembly to an input end of positive and negative input ends of the second inverting adder, and inputting the nominal current of the supercapacitor assembly to the other input end, to obtain a difference between the instantaneous current and the nominal current of the supercapacitor assembly; and step 7: inputting the difference between the instantaneous current and the nominal current of the supercapacitor assembly to the second PI controller, a signal output of which is modulated by the PWM modem and then converted into a pulse signal used to control the on/off of the power switch devices of the bidirectional DC-DC converter.

Further, the virtual inertia time constant is set between 2.5 s to 10 s.

The present invention has following advantages and positive effects:

(1) As a kind of renewable energy, the present invention can achieve friendly gird-connection of photovoltaic power generation systems to improve the frequency regulation capability of the power grid, and enhances the security and stability of the power grid.

(2) As an energy storage device, supercapacitor has the advantages of fast charge and discharge rate, high power density, long cycle life, etc., and when the system frequency is restored to the nominal value, the DC voltage of the supercapacitor is also restored to the rated value, no additional charging equipment is required, and good buffering effect is provided.

(3) Due to the control capability of the bidirectional DC-DC converter, the terminal voltage of the supercapacitor bank and the DC-link voltage may be quite different, so the utilization rate of the supercapacitor can be improved and the installation cost of the supercapacitor can be reduced.

(4) The virtual inertia control module obtains the reference value of the DC voltage of the supercapacitor through the calculation of the instantaneous frequency of the power grid, and directly controls the voltage of the supercapacitor without introducing the derivative frequency with respect to time df/d, thereby avoids the influence of frequency noise on system stability.

BRIEF DESCRIPTION OF THE DRAWINGS

FIG. 4 is a working principle diagram of a virtual inertia control module according to the present invention, in which:

Figure 1:
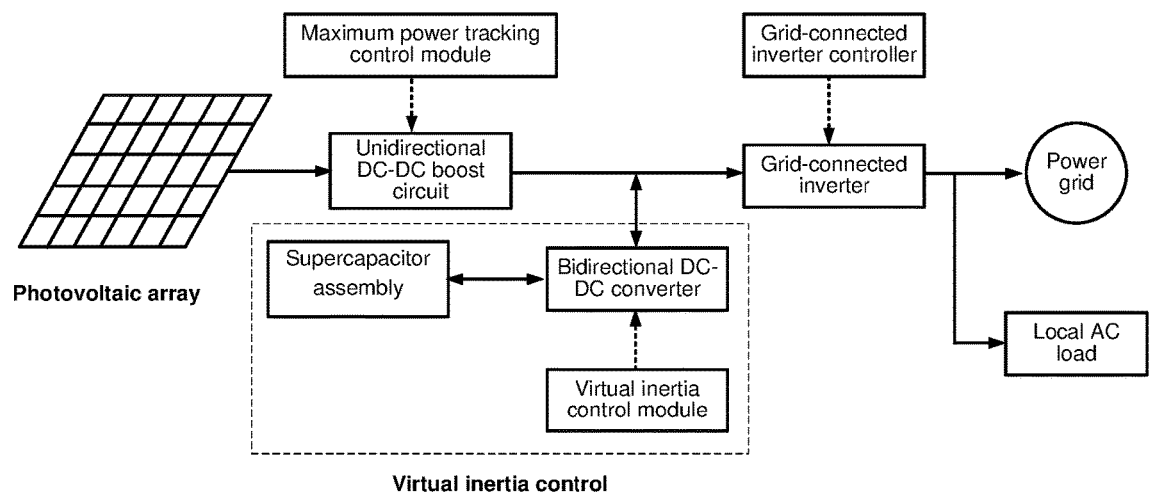
FIG. 1 is a block diagram of a virtual inertia compensation system according to the present invention.

1: monomer supercapacitor;

$g_1$: first fully-controlled power switch device;

$g_2$: second fully-controlled power switch device; and

L: inductor.

DETAILED DESCRIPTION OF THE PRESENT INVENTION

In order to further understand the content, features and effects of the present invention, the following embodiments will be listed and detailed with reference to the accompanying drawings:

With reference to FIGS. 1-4, a photovoltaic power generation virtual inertia compensation system based on SCES comprises a photovoltaic array, a unidirectional DC-DC boost circuit and a grid-connected inverter, which are electrically connected in sequence, the grid-connected inverter outputting alternating current to the power grid, and further comprises a supercapacitor assembly for energy storage, a bidirectional DC-DC converter and a virtual inertia control module; a port on a side of the bidirectional DC-DC converter is electrically connected to an output end of the unidirectional DC-DC boost circuit and an input end of the power grid inverter, and a port on the other side thereof is electrically connected to the supercapacitor assembly; the bidirectional DC-DC converter comprises two power switch devices; the virtual inertia control module comprises a first inverting adder, a virtual inertia converter, a second inverting adder, a first PI controller, a third inverting adder, a second PI controller and a PWM modem, which are electrically connected in sequence; that is, the first inverting adder outputs a signal to the virtual inertia converter, the virtual inertia converter outputs a signal to the second inverting adder, the second inverting adder outputs a signal to the first PI controller, the first PI controller outputs a signal to the third inverting adder, the third inverting adder outputs a signal to the second PI controller, and the second PI controller outputs a signal to the PWM modem.

Wherein the instantaneous frequency and nominal frequency of the power grid are each input to positive and negative input ends of the first inverting adder; a difference between the instantaneous frequency of the power grid and the nominal frequency of the power grid is input to the virtual inertia converter, and the virtual inertia converter outputs a nominal voltage of the supercapacitor assembly; an input end of the positive and negative input ends of the second inverting adder is electrically connected to an output end of a nominal voltage calculator of the supercapacitor assembly, and an instantaneous voltage of the supercapacitor assembly is input to the other input end of the second inverting adder; an input end of the third inverting adder is electrically connected to an output end of the first PI controller, and the instantaneous current of the supercapacitor assembly is input to the other input end of the third inverting adder; the PWM modem outputs pulse signals to control the on/off of the power switch devices of the bidirectional DC-DC converter, thus to control the on-duty ratio of the power switch devices of the bidirectional DC-DC converter.

The definitions of some English abbreviations in the present invention are as follows: DC represents direct current, PI represents proportional integral, PWM means pulse width modulation, and PLL means phase-locked loop.

The unidirectional DC-DC boost circuit may be controlled by the maximum power point tracking control module. The unidirectional DC-DC boost circuit includes power switch devices; the maximum power point tracking control module collects the output voltage and current of the photovoltaic array, and outputs pulse signals to control the on/off of the power switch devices of the DC-DC boost circuit.

The grid-connected inverter includes power switch devices. The grid-connected inverter usually uses a grid-connected inverter controller to control the on/off of the power switch devices of the grid-connected inverter. The grid-connected inverter controller can collect the three-phase voltage signal and the three-phase current signal on the output side of the grid-connected inverter, and output pulse signals to control the on/off of the power switch devices of the grid-connected inverter.

The PI controller, also called PI regulator, is a kind of linear controller. According to the control deviation formed by the difference between the reference value and the actual value, the PI controller combines the proportion and integral of the deviation to form a control quantity through a linear combination to control the object to be controlled.

The above-mentioned unidirectional DC-DC boost circuit, the grid-connected inverter, the bidirectional DC-DC converter, the maximum power point tracking control module, the grid-connected inverter controller, the first inverting adder, the second inverting adder, the third inverting adder, the first PI controller, the second PI controller, the PWM modem, the virtual inertia converter, etc., may all be devices and modules known in the prior art, or may be constructed by technical means known in the prior art.

The instantaneous frequency and nominal frequency of the power grid are each input to positive and negative input ends of the first inverting adder. For example, if the instantaneous frequency of the power grid is input to the positive input end of the first inverting adder, then the nominal frequency of the power grid is input to the negative input end of the first inverting adder. If the instantaneous frequency of the power grid is input to the negative input end of the first inverting adder, then the nominal frequency of the power grid is input to the positive input end of the first inverting adder.

The difference between the instantaneous frequency of the power grid and the nominal frequency of the power grid is input to the virtual inertia converter, and the virtual inertia converter outputs the nominal voltage of the supercapacitor assembly. By simulating the function relationship between the mechanical inertia time constant of the synchronous generator and the inertia time constant of the supercapacitor assembly, the virtual inertia converter converts the difference between the instantaneous frequency and the nominal frequency of the power grid to the nominal voltage of the supercapacitor assembly.

By the functional relationship between the mechanical inertia time constant of the synchronous generator and the inertia time constant of the supercapacitor assembly, the following formula may be derived:

$$U_{dc}^* = \sqrt{U_{dc0}^2 + \frac{4H_{pv}S_{pv}}{C_{sup}f_0}(f - f_0)}$$

where $U_{dc0}$ represents the rated DC voltage of the supercapacitor assembly, $H_{pv}$ represents the virtual inertia time constant, $S_{pv}$ represents the rated capacity of the photovoltaic array, $C_{sup}$ represents the capacitance of the supercapacitor assembly, $f_0$ represents the nominal frequency of the power grid, and f represents the instantaneous frequency of the power grid.

The specific derivation will be described below.

When the power grid is disturbed, the formula for the inertia compensation power for the synchronous generator is as follows:

$$\Delta P_{inertia} = \frac{2H}{f_0}\frac{df}{dt}$$

where $\Delta P_{inertia}$ represents the inertia compensation power of the synchronous generator, H represents the mechanical inertia time constant of the synchronous generator, $f_0$ represents the nominal frequency of the power grid, and f represents the instantaneous frequency of the power grid.

The formula for calculating the change in power during charging and discharging of the supercapacitor assembly is as follows:

$$\Delta P_C = \frac{C_{sup}U_{dc}}{S_{pv}}\frac{dU_{dc}}{dt}$$

where $\Delta P_c$ represents the absorbed or released electromagnetic power, $C_{sup}$ represents the capacitance of the supercapacitor assembly, $U_{dc}$ represents the actual DC voltage of the supercapacitor assembly, and $S_{pv}$ represents the rated capacity of the photovoltaic array.

When using the supercapacitor assembly to simulate the inertia compensation of the synchronous generator, $$\Delta P_{inertia} = \Delta P_C$$

$$\frac{2H_{pv}}{f_0}\frac{df}{dt} = \frac{C_{sup}U_{dc}}{S_{pv}}\frac{dU_{dc}}{dt}$$

where $H_{pv}$ represents the virtual inertial time constant

The above formulas are simplified and integrated to obtain:

$$\int \frac{2H_{pv}}{f_0}df = \int \frac{C_{sup}U_{dc}}{S_{pv}}dU_{dc}$$

$$\frac{2H_{pv}}{f_0}(f-f_0) = \frac{C_{sup}}{2S_{pv}}(U_{dc}^2 - U_{dc0}^2)$$

then:

$$U_{dc}^* = \sqrt{U_{dc0}^2 + \frac{4H_{pv}S_{pv}}{C_{sup}f_0}(f-f_0)}$$

where $U_{dc0}$ represents the rated DC voltage of the supercapacitor assembly, and $U_{dc}^*$ represents the reference value of the DC voltage of the supercapacitor assembly.

The above formulas may be adjusted according to the instantaneous frequency of the power grid and the nominal frequency of the power grid correspondingly input to the positive and negative input ends of the first inverting adder.

The instantaneous voltage and nominal voltage of the supercapacitor assembly are each input to the positive and negative input ends of the second inverting adder. For example, if the nominal voltage of the supercapacitor assembly is input to the positive input end of the second inverting adder, then the instantaneous voltage of the supercapacitor assembly is input to the negative input end of the second inverting adder. If the instantaneous voltage of the supercapacitor assembly is input to the positive input end of the second inverting adder, then the nominal voltage of the supercapacitor assembly is input to the negative input end of the second inverting adder.

The difference between the instantaneous voltage of the supercapacitor assembly and the nominal voltage of the supercapacitor assembly is input to the first PI controller, and the first PI controller outputs the nominal current of the supercapacitor assembly. According to the input requirement of the first PI controller, the signal output by the second inverting adder may be inverted by the inverter and then output.

The instantaneous current and nominal current of the supercapacitor assembly are each input to the positive and negative input ends of the third inverting adder. For example, the nominal current of the supercapacitor assembly is input to the positive input end of the third inverting adder, and the instantaneous current of the supercapacitor assembly is input to the negative input end of the third inverting adder. If the instantaneous current of the supercapacitor assembly is input to the positive input end of the third inverting adder, then the nominal current of the supercapacitor assembly is input to the negative input end of the third inverting adder.

The difference between the instantaneous current of the supercapacitor assembly and the nominal current of the supercapacitor assembly is input to the second PI controller. The second PI controller outputs a signal to the PWM modem for modulating the signal, and then the PWM modem outputs pulse signals to control the on/off of the power switch devices of the bidirectional DC-DC converter. The PWM modem outputs one control signal for each power switch device. According to the input requirement of the second PI controller, the signal output by the third inverting adder may be inverted by the inverter and then output.

Further, the virtual inertia control module may further comprises a power grid frequency acquisition unit configured to acquire an instantaneous frequency of the power grid, a voltage acquisition unit configured to acquire the instantaneous voltage of the supercapacitor assembly, and a current acquisition unit configured to acquire the instantaneous current of the supercapacitor assembly.

Further, the power grid frequency acquisition unit may be provided with a phase-locked loop (PLL) configured to detect the instantaneous frequency of the power grid.

Figure 2:
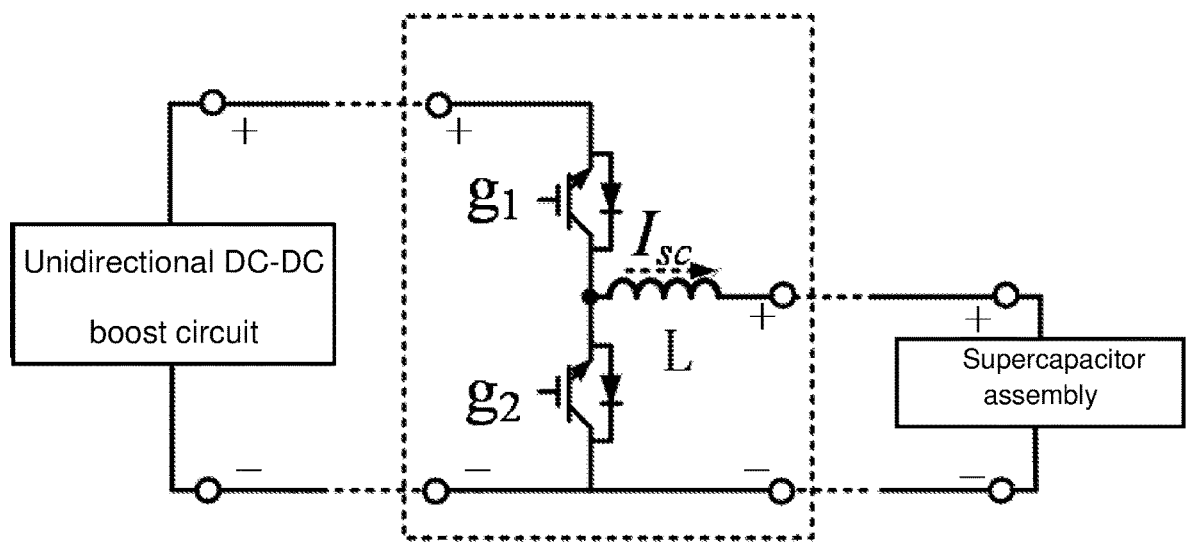
FIG. 2 is a structural topology diagram of a bidirectional DC-DC converter according to the present invention.

Further, with reference to FIG. 2, the bidirectional DC-DC converter may comprise a first fully-controlled power switch device $g_1$, a second fully-controlled power switch device $g_2$ and an inductor L; an emitter of the first fully-controlled power switch device $g_1$ is connected to the positive output end of the unidirectional DC-DC boost circuit; a collector of the second fully-controlled power switch device $g_2$ is connected to the negative output end of the unidirectional DC-DC boost circuit; a collector of the first fully-controlled power switch device $g_1$ is connected to an emitter of the second fully-controlled power switch device $g_2$ and also connected to one end of the inductor L, and the other end of the inductor L is connected to an anode of the supercapacitor assembly; and the virtual inertia control module outputs a pulse signal to correspondingly control the on-duty ratio of the first and second fully-controlled power switch devices. The inductor L may be used for energy storage and filtering.

Further, the power switch devices of the bidirectional DC-DC converter may be IGBT, MOSFET or IGCT power switch devices.

Further, the supercapacitor assembly may comprise a plurality of parallel supercapacitor branches; and each supercapacitor branch may comprise a plurality of monomer supercapacitors 1 connected in series.

The present invention further provides an embodiment of a photovoltaic power generation virtual inertia compensation method based on SCES using the photovoltaic power generation virtual inertia compensation system based on supercapacitor energy storage. The method comprises the following steps:

step 1: setting a virtual inertia time constant;

step 2: acquiring the instantaneous frequency of the power grid, inputting the instantaneous frequency to an input end of positive and negative input ends of a first inverting adder, and inputting a nominal frequency of the power grid to the other input end, to obtain a difference between the instantaneous frequency and the nominal frequency of the power grid;

step 3: inputting the difference between the instantaneous frequency and the nominal frequency of the power grid to a virtual inertia converter that converts the difference according to the following formula to obtain a nominal voltage of the supercapacitor assembly:

$$U_{dc}^* = \sqrt{U_{dc0}^2 + \frac{4H_{pv}S_{pv}}{C_{sup}f_0}(f-f_0)}$$

where $U_{dc0}$ represents the rated DC voltage of the supercapacitor assembly, $H_{pv}$ represents the virtual inertia time constant, $S_{pv}$ represents the rated capacity of the photovoltaic array, $C_{sup}$ represents the capacitance of the supercapacitor assembly, $f_0$ represents the nominal frequency of the power grid, and f represents the instantaneous frequency of the power grid.

step 4: acquiring the instantaneous voltage of the supercapacitor assembly, inputting the instantaneous voltage of the supercapacitor assembly to an input end of the positive and negative input ends of the first inverting adder, and inputting the nominal voltage of the supercapacitor assembly to the other input end, to obtain a difference between the instantaneous voltage and the nominal voltage of the supercapacitor assembly;

step 5: inputting the difference between the instantaneous voltage and the nominal voltage of the supercapacitor assembly to the first PI controller that outputs a nominal current of the supercapacitor assembly;

step 6: acquiring an instantaneous current of the supercapacitor assembly, inputting the instantaneous current of the supercapacitor assembly to an input end of positive and negative input ends of the second inverting adder, and inputting a nominal current of the supercapacitor assembly to the other input end, to obtain a difference between the instantaneous current and the nominal current of the supercapacitor assembly; and step 7: inputting the difference between the instantaneous current and the nominal current of the supercapacitor assembly to the second PI controller, a signal output of which is modulated by the PWM modem and then converted into pulse signals used to control the on/off of the power switch devices of the bidirectional DC-DC converter.

Further, the virtual inertia time constant is set between 2.5 s to 10 s. The setting of the virtual inertia time constant needs to consider factors, such as the installation location of the photovoltaic unit, the average inertia of the power grid, the energy storage capacity, and the fluctuation of load. The virtual inertia time constant is usually set between 2.5 s to 10 s.

A preferred embodiment of the present invention is used to further illustrate the working principle of the present invention as follows.

The photovoltaic power generation virtual inertia compensation system based on SCES, as shown in FIG. 1, comprises a photovoltaic array, a unidirectional DC-DC boost circuit and a grid-connected inverter, which are electrically connected in sequence, the grid-connected inverter outputting alternating current to the power grid, and further comprises a supercapacitor assembly for energy storage, a bidirectional DC-DC converter and a virtual inertia control module; one end of the bidirectional DC-DC converter is electrically connected to an output end of the unidirectional DC-DC boost circuit and an input end of the power grid inverter, and the other end thereof is electrically connected to the supercapacitor assembly; the unidirectional DC-DC boost circuit may be controlled by a maximum power point tracking control module to control the on/off of the power switch devices of the DC-DC boost circuit. The grid-connected inverter includes power switch devices. The grid-connected inverter usually uses a grid-connected inverter controller to control the on/off of the power switch devices of the grid-connected inverter. The bidirectional DC-DC converter includes power switch devices, the on/off of which are controlled by the virtual inertia control module.

Figure 4:
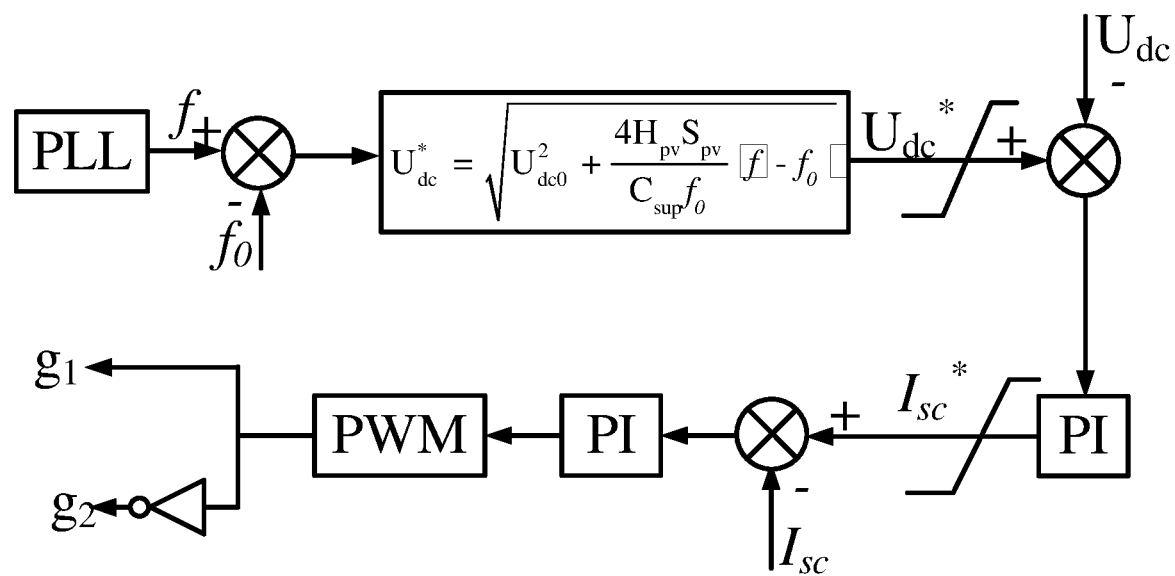

As shown in FIG. 4, the virtual inertia control module comprises a first inverting adder, a virtual inertia converter, a second inverting adder, a first PI controller, a third inverting adder, a second PI controller and a PWM modem, which are electrically connected in sequence; wherein, the instantaneous frequency of the power grid is input to the positive input end of the first inverting adder, then the nominal frequency of the power grid is input to the negative input end of the first inverting adder; a difference between the instantaneous frequency of the power grid and the nominal frequency of the power grid is input to the virtual inertia converter, and the virtual inertia converter outputs the nominal voltage of the supercapacitor assembly; the positive input end of the second inverting adder is electrically connected to an output end of a virtual inertia converter, and the instantaneous voltage of the supercapacitor assembly is input to the negative input end of the second inverting adder; the positive input end of the third inverting adder is electrically connected to an output end of the first PI controller, and the instantaneous current of the supercapacitor assembly is input to the negative input end of the third inverting adder; the first PI controller outputs a signal to the PWM modem, and the PWM modem modulates the signal and outputs pulse signals to control the on/off of the power switch devices of the bidirectional DC-DC converter.

Under the control of the virtual inertia control module, the DC voltage of the supercapacitor may be flexibly adjusted according to the operating conditions of the system, so as to provide inertia response to the AC power grid and local AC loads, thereby enhancing the stability of the power grid.

Referring to FIG. 2, the bidirectional DC-DC converter includes a first fully-controlled power switch device $g_1$, a second fully-controlled power switch device $g_2$, and an inductor L, wherein one end of the inductor L is connected to a common end of the first fully-controlled power switch device $g_1$ and the second fully-controlled power switch device $g_2$, and the other end is connected to the anode of the supercapacitor assembly. The virtual inertia control module outputs a signal to control the on-duty ratio of the fully-controlled power switch devices.

Figure 3:
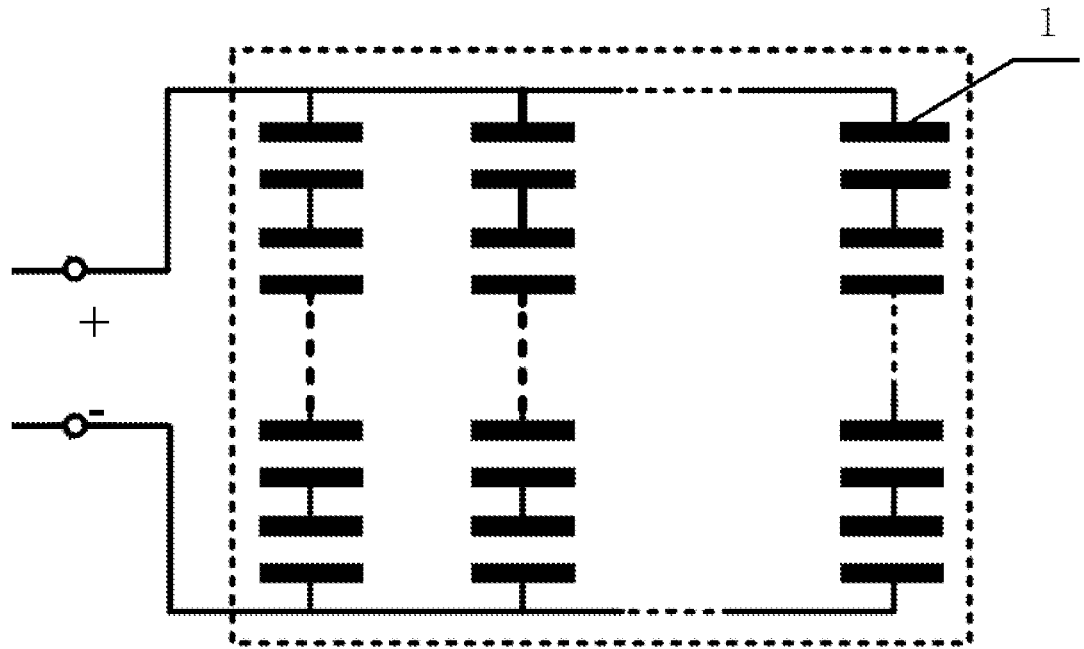
FIG. 3 is a structural topology diagram of a supercapacitor assembly according to the present invention.

FIG. 3 shows a supercapacitor assembly according to the present invention. Multiple monomer supercapacitors 1 are connected in series to form a supercapacitor branch. Multiple supercapacitor branches may be equipped with and connected in parallel to a voltage equalizing circuit to form a supercapacitor assembly. The specific series-parallel method depends upon the actual needs of the system. Generally, the voltage of the monomer supercapacitor does not exceed its rated withstand voltage.

The photovoltaic power generation virtual inertia compensation method based on supercapacitor energy storage using the photovoltaic power generation virtual inertia compensation system based on supercapacitor energy storage includes the following steps.

In the step 1, the nominal voltage of the supercapacitor assembly is calculated and updated according to the instantaneous frequency of the power grid. This step 1 includes the following sub-steps.

In the sub-step (1-1), the instantaneous frequency f of the AC power grid is detected by the phase-locked loop inside the grid-connected inverter controller.

In the sub-step (1-2), the DC voltage reference value of the supercapacitor assembly is calculated and updated. The DC voltage reference value $U_{dc}^*$ of the supercapacitor assembly is calculated by the following formula:

$$U_{dc}^* = \sqrt{U_{dc0}^2 + \frac{4H_{pv}S_{pv}}{C_{sup}f_0}(f - f_0)}$$

where $U_{dc0}$ represents the rated DC voltage of the supercapacitor assembly, $H_{pv}$ represents the virtual inertia time constant, $S_{pv}$ represents the rated capacity of the photovoltaic array, $C_{sup}$ represents the capacitance of the supercapacitor assembly, $f_0$ represents the nominal frequency of the power grid, and f represents the instantaneous frequency of the power grid.

In the step 2, according to the difference between the DC voltage reference value $U_{dc}{}^*$ of the supercapacitor assembly and the actually measured value $U_{dc}$, the DC current reference value $I_{sc}{}^*$ on the supercapacitor side is obtained by the PI controller.

In the step 3, according to the difference between the DC current reference value $I_{sc}{}^*$ on the supercapacitor assembly side and the DC current actual value $I_{sc}$ on the supercapacitor assembly side, by the PI controllers and the PWM modem, modulated pulse signals $g_1$ and $g_2$ are generated respectively for correspondingly controlling the on/off of two IGBT power switch devices of the bidirectional DC-DC converter.

The above-mentioned embodiments are merely used to illustrate the technical ideas and features of the present invention, to enable those skilled in the art to understand the content of the present invention and implement the present invention accordingly. The patent scope of the present invention is not limited only by the embodiments. That is, any equivalent changes or modifications to the spirit disclosed in the present invention still fall into the patent scope of the present invention.

What is claimed is:

1. A photovoltaic power generation virtual inertia compensation system based on SCES, comprising a photovoltaic array, a unidirectional DC-DC boost circuit and a grid-connected inverter, which are electrically connected in sequence, the grid-connected inverter outputting alternating current to the power grid,
    wherein the virtual inertia compensation system further comprises a supercapacitor assembly for energy storage, a bidirectional DC-DC converter and a virtual inertia control module; a port on a side of the bidirectional DC-DC converter is electrically connected to an output end of the unidirectional DC-DC boost circuit and an input end of the power grid inverter, and a port on the other side thereof is electrically connected to the supercapacitor assembly;
    the bidirectional DC-DC converter comprises two power switch devices; the virtual inertia control module comprises a first inverting adder, a virtual inertia converter, a second inverting adder, a first PI controller, a third inverting adder, a second PI controller and a PWM modem, which are electrically connected in sequence; wherein instantaneous frequency and nominal frequency of the power grid are each input to positive and negative input ends of the first inverting adder;
    a difference between the instantaneous frequency of the power grid and the nominal frequency of the power grid is input to the virtual inertia converter, and the virtual inertia converter outputs a nominal voltage of the supercapacitor assembly; an input end of the positive and negative input ends of the second inverting adder is electrically connected to an output end of a nominal voltage calculator of the supercapacitor assembly, and the instantaneous voltage of the supercapacitor assembly is input to the other input end of the second inverting adder;
    an input end of the positive and negative input ends of the third inverting adder is electrically connected to an output end of the first PI controller, and an instantaneous current of the supercapacitor assembly is input to the other input end of the third inverting adder; and
    the PWM modem outputs pulse signals to control the on/off of the power switch devices of the bidirectional DC-DC converter.

2. The photovoltaic power generation virtual inertia compensation system based on SCES according to claim 1, wherein the virtual inertia control module further comprises a power grid frequency acquisition unit configured to acquire the instantaneous frequency of the power grid, a voltage acquisition unit configured to acquire the instantaneous voltage of the supercapacitor assembly, and a current acquisition unit configured to acquire the instantaneous current of the supercapacitor assembly.

3. The photovoltaic power generation virtual inertia compensation system based on SCES according to claim 2, wherein the power grid frequency acquisition unit is provided with a phase-locked loop configured to detect the instantaneous frequency of the power grid.

4. The photovoltaic power generation virtual inertia compensation system based on SCES according to claim 1, wherein the bidirectional DC-DC converter comprises a first fully-controlled power switch device, a second fully-controlled power switch device and an inductor; an emitter of the first fully-controlled power switch device is connected to the positive output end of the unidirectional DC-DC boost circuit; a collector of the second fully-controlled power switch device is connected to the negative output end of the unidirectional DC-DC boost circuit; a collector of the first fully-controlled power switch device is connected to an emitter of the second fully-controlled power switch device and also connected to one end of the inductor, and the other end of the inductor is connected to an anode of the supercapacitor assembly; and the virtual inertia control module outputs a pulse signal to correspondingly control the on-duty ratio of the first and second fully-controlled power switch devices.

5. The photovoltaic power generation virtual inertia compensation system based on SCES according to claim 1, wherein the power switch devices of the bidirectional DC-DC converter are IGBT, MOSFET or IGCT power switch devices.

6. The photovoltaic power generation virtual inertia compensation system based on SCES according to claim 1, wherein the supercapacitor assembly comprises a plurality of paralleled supercapacitor branches; and each supercapacitor branch comprises a plurality of monomer supercapacitors connected in series.

7. A photovoltaic power generation virtual inertia compensation method using the photovoltaic power generation virtual inertia compensation system according to claim 1, wherein the method comprises the following steps:
    step 1: setting a virtual inertia time constant;
    step 2: acquiring an instantaneous frequency of a power grid, inputting the instantaneous frequency of the power grid to an input end of positive and negative input ends of a first inverting adder, and inputting a nominal frequency of the power grid to the other input end, to obtain a difference between the instantaneous frequency and the nominal frequency of the power grid;
    step 3: inputting the difference between the instantaneous frequency and the nominal frequency of the power grid to a virtual inertia converter that converts the difference according to the following formula to obtain a nominal voltage of a supercapacitor assembly:

$$U_{dc}^* = \sqrt{U_{dc0}^2 + \frac{4H_{pv}S_{pv}}{C_{sup}f_0}(f - f_0)}$$

where $U_{dc0}$ represents the rated DC voltage of the supercapacitor assembly, $H_{pv}$ represents the virtual inertia time constant, $S_{pv}$ represents the rated capacity of the photovoltaic array, $C_{sup}$ represents the capacitance of the supercapacitor assembly, $f_0$ represents the nominal frequency of the power grid, and f represents the instantaneous frequency of the power grid;

step 4: acquiring an instantaneous voltage of the supercapacitor assembly, inputting the instantaneous voltage of the supercapacitor assembly to an input end of the positive and negative input ends of the first inverting adder, and inputting the nominal voltage of the supercapacitor assembly to the other input end, to obtain a difference between the instantaneous voltage and the nominal voltage of the supercapacitor assembly;

step 5: inputting the difference between the instantaneous voltage and the nominal voltage of the supercapacitor assembly to the first PI controller that outputs a nominal current of the supercapacitor assembly;

step 6: acquiring an instantaneous current of the supercapacitor assembly, inputting the instantaneous current of the supercapacitor assembly to an input end of positive and negative input ends of the second inverting adder, and inputting a nominal current of the supercapacitor assembly to the other input end, to obtain a difference between the instantaneous current and the nominal current of the supercapacitor assembly; and step 7: inputting the difference between the instantaneous current and the nominal current of the supercapacitor assembly to the second PI controller, a signal output of which is modulated by the PWM modem and then converted into pulse signals used to control the on/off of the power switch devices of the bidirectional DC-DC converter.

8. The photovoltaic power generation virtual inertia compensation method based on SCES according to claim 7, wherein the virtual inertia time constant is set between 2.5 s to 10 s.

9. The photovoltaic power generation virtual inertia compensation method using the photovoltaic power generation virtual inertia compensation system according to claim 7, wherein the virtual inertia control module further comprises a power grid frequency acquisition unit configured to acquire the instantaneous frequency of the power grid, a voltage acquisition unit configured to acquire the instantaneous voltage of the supercapacitor assembly, and a current acquisition unit configured to acquire the instantaneous current of the supercapacitor assembly.

10. The photovoltaic power generation virtual inertia compensation method using the photovoltaic power generation virtual inertia compensation system according to claim 7, wherein the power grid frequency acquisition unit is provided with a phase-locked loop configured to detect the instantaneous frequency of the power grid.

11. The photovoltaic power generation virtual inertia compensation method using the photovoltaic power generation virtual inertia compensation system according to claim 7, wherein the bidirectional DC-DC converter comprises a first fully-controlled power switch device, a second fully-controlled power switch device and an inductor; an emitter of the first fully-controlled power switch device is connected to the positive output end of the unidirectional DC-DC boost circuit; a collector of the second fully-controlled power switch device is connected to the negative output end of the unidirectional DC-DC boost circuit; a collector of the first fully-controlled power switch device is connected to an emitter of the second fully-controlled power switch device and also connected to one end of the inductor, and the other end of the inductor is connected to an anode of the supercapacitor assembly; and the virtual inertia control module outputs a pulse signal to correspondingly control the on-duty ratio of the first and second fully-controlled power switch devices.

12. The photovoltaic power generation virtual inertia compensation method using the photovoltaic power generation virtual inertia compensation system according to claim 7, wherein the power switch devices of the bidirectional DC-DC converter are IGBT, MOSFET or IGCT power switch devices.

13. The photovoltaic power generation virtual inertia compensation method using the photovoltaic power generation virtual inertia compensation system according to claim 7, wherein the supercapacitor assembly comprises a plurality of paralleled supercapacitor branches; and each supercapacitor branch comprises a plurality of monomer supercapacitors connected in series.

* * * * *